US011954762B2

(12) United States Patent
Ivanov et al.

(10) Patent No.: US 11,954,762 B2
(45) Date of Patent: Apr. 9, 2024

(54) OBJECT REPLACEMENT SYSTEM

(71) Applicant: Snap Inc., Santa Monica, CA (US)

(72) Inventors: Viacheslav Ivanov, London (GB);
Aleksei Zhuravlev, London (GB)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/648,363

(22) Filed: Jan. 19, 2022

(65) Prior Publication Data

US 2023/0230292 A1 Jul. 20, 2023

(51) Int. Cl.
| | |
|---|---|
| G06T 11/00 | (2006.01) |
| G06V 10/74 | (2022.01) |
| G06V 10/774 | (2022.01) |
| G06V 10/776 | (2022.01) |
| G06V 10/82 | (2022.01) |

(Continued)

(52) U.S. Cl.
CPC ............. *G06T 11/00* (2013.01); *G06V 10/74* (2022.01); *G06V 10/774* (2022.01); *G06V 10/776* (2022.01); *G06V 10/82* (2022.01); *G06V 20/20* (2022.01); *G06V 40/174* (2022.01)

(58) Field of Classification Search
CPC ....... G06T 11/00; G06T 19/006; G06V 10/74; G06V 10/774; G06V 10/776; G06V 10/82; G06V 20/20; G06V 40/174
See application file for complete search history.

(56) References Cited

U.S. PATENT DOCUMENTS

| | | |
|---|---|---|
| 5,880,731 A | 3/1999 | Liles et al. |
| 6,023,270 A | 2/2000 | Brush, II et al. |
| 6,223,165 B1 | 4/2001 | Lauffer |

(Continued)

FOREIGN PATENT DOCUMENTS

| | | |
|---|---|---|
| CN | 104156700 A | 11/2014 |
| CN | 103390287 B | 8/2018 |

(Continued)

OTHER PUBLICATIONS

"U.S. Appl. No. 17/566,046, Non Final Office Action dated Jul. 20, 2023", 13 pgs.

(Continued)

*Primary Examiner* — Jeffery A Brier
(74) *Attorney, Agent, or Firm* — Schwegman Lundberg & Woessner, P.A.

(57) ABSTRACT

Aspects of the present disclosure involve a system comprising a computer-readable storage medium storing a program and a method for performing operations comprising: receiving an image that includes a depiction of a real-world environment; processing the image to obtain data indicating presence of a real-world object in the real-world environment; receiving input that selects an AR experience comprising an AR object; determining that the real-world object detected in the real-world environment depicted in the image indicated in the obtained data corresponds to the AR object; applying a machine learning technique to the image to generate a new image that depicts the real-world environment without the real-world object; and applying the AR object to the new image to generate a modified new image that depicts the real-world environment including the AR object in place of the real-world object.

20 Claims, 11 Drawing Sheets

(51) Int. Cl.
*G06V 20/20* (2022.01)
*G06V 40/16* (2022.01)

(56) References Cited

U.S. PATENT DOCUMENTS

| | | |
|---|---|---|
| 6,772,195 B1 | 8/2004 | Hatlelid et al. |
| 6,842,779 B1 | 1/2005 | Nishizawa |
| 7,113,917 B2 | 9/2006 | Jacobi et al. |
| 7,342,587 B2 | 3/2008 | Danzig et al. |
| 7,391,900 B2 | 6/2008 | Kim et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,159,166 B2 | 10/2015 | Finn et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,002,337 B2 | 6/2018 | Siddique et al. |
| 10,026,209 B1 | 7/2018 | Dagley et al. |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,250,948 B1 | 4/2019 | Bortz et al. |
| 10,262,250 B1 | 4/2019 | Spiegel et al. |
| 10,362,219 B2 | 7/2019 | Wilson et al. |
| 10,475,225 B2 | 11/2019 | Park et al. |
| 10,482,674 B1 | 11/2019 | Wu et al. |
| 10,504,266 B2 | 12/2019 | Blattner et al. |
| 10,573,048 B2 | 2/2020 | Ni et al. |
| 10,657,701 B2 | 5/2020 | Osman et al. |
| 10,956,967 B2 | 3/2021 | Ayush et al. |
| 11,024,092 B2 | 6/2021 | Harviainen |
| 11,210,863 B1 | 12/2021 | Yan et al. |
| 11,887,260 B2 | 1/2024 | Assouline et al. |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0162942 A1 | 7/2007 | Hamynen et al. |
| 2007/0168863 A1 | 7/2007 | Blattner et al. |
| 2007/0176921 A1 | 8/2007 | Iwasaki et al. |
| 2008/0071559 A1 | 3/2008 | Arrasvuori |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0045869 A1 | 2/2010 | Baseley et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn et al. |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0056717 A1 | 3/2012 | Maharbiz et al. |
| 2012/0068913 A1 | 3/2012 | Bar-Zeev et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |

(56) References Cited

U.S. PATENT DOCUMENTS

| | | |
|---|---|---|
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2014/0168056 A1 | 6/2014 | Swaminathan et al. |
| 2014/0298382 A1 | 10/2014 | Jo et al. |
| 2014/0298383 A1 | 10/2014 | Jo et al. |
| 2014/0317659 A1 | 10/2014 | Yasutake |
| 2014/0362084 A1 | 12/2014 | Ooi et al. |
| 2015/0193982 A1 | 7/2015 | Mihelich et al. |
| 2015/0206349 A1 | 7/2015 | Rosenthal et al. |
| 2015/0310667 A1 | 10/2015 | Young et al. |
| 2015/0317829 A1 | 11/2015 | Carter et al. |
| 2015/0331970 A1 | 11/2015 | Jovanovic |
| 2016/0134840 A1 | 5/2016 | Mcculloch |
| 2016/0210784 A1 | 7/2016 | Ramsby et al. |
| 2016/0234149 A1 | 8/2016 | Tsuda et al. |
| 2016/0343171 A1 | 11/2016 | Waldman et al. |
| 2016/0379405 A1 | 12/2016 | Baca et al. |
| 2017/0069141 A1 | 3/2017 | Carter et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Dusen et al. |
| 2017/0299394 A1 | 10/2017 | Lee |
| 2017/0310934 A1 | 10/2017 | Du et al. |
| 2017/0312634 A1 | 11/2017 | Ledoux et al. |
| 2018/0005448 A1 | 1/2018 | Choukroun et al. |
| 2018/0045963 A1 | 2/2018 | Hoover et al. |
| 2018/0047200 A1 | 2/2018 | O'hara et al. |
| 2018/0082480 A1 | 3/2018 | White et al. |
| 2018/0113587 A1 | 4/2018 | Allen et al. |
| 2018/0115503 A1 | 4/2018 | Baldwin et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0094981 A1 | 3/2019 | Bradski et al. |
| 2019/0096046 A1* | 3/2019 | Kalantari ............... G06T 7/337 |
| 2019/0108683 A1 | 4/2019 | Valli et al. |
| 2019/0188920 A1 | 6/2019 | Mcphee et al. |
| 2019/0205646 A1 | 7/2019 | Piramuthu et al. |
| 2019/0310757 A1 | 10/2019 | Lee et al. |
| 2019/0378204 A1 | 12/2019 | Ayush et al. |
| 2020/0175311 A1* | 6/2020 | Xu ............................ B60D 1/62 |
| 2020/0211288 A1 | 7/2020 | Woods et al. |
| 2020/0242813 A1 | 7/2020 | Nishikawa et al. |
| 2020/0394843 A1 | 12/2020 | Ramachandra Iyer |
| 2020/0413011 A1 | 12/2020 | Zass et al. |
| 2021/0027083 A1* | 1/2021 | Cohen ..................... G06V 20/10 |
| 2021/0027471 A1* | 1/2021 | Cohen ....................... G06T 7/11 |
| 2021/0042988 A1 | 2/2021 | Molyneaux et al. |
| 2021/0183128 A1 | 6/2021 | Miller |
| 2021/0295599 A1 | 9/2021 | Adkinson et al. |
| 2021/0383116 A1 | 12/2021 | Mavrantonakis et al. |
| 2021/0383912 A1* | 12/2021 | Jackson ................... B60T 7/18 |
| 2022/0058553 A1 | 2/2022 | Stewart et al. |
| 2022/0068037 A1* | 3/2022 | Pardeshi ................. G06T 7/70 |
| 2022/0101638 A1 | 3/2022 | Bae et al. |
| 2022/0156426 A1 | 5/2022 | Hampali et al. |
| 2022/0222724 A1 | 7/2022 | Graham |
| 2022/0327608 A1 | 10/2022 | Assouline et al. |
| 2022/0366189 A1* | 11/2022 | Oreifej ................... G06V 10/30 |
| 2022/0413434 A1* | 12/2022 | Parra Pozo .......... G03H 1/0005 |
| 2023/0022194 A1* | 1/2023 | Soryal ..................... G06T 3/40 |
| 2023/0214900 A1 | 7/2023 | Assouline et al. |
| 2023/0215104 A1 | 7/2023 | Assouline et al. |
| 2023/0215105 A1 | 7/2023 | Assouline et al. |
| 2023/0230328 A1 | 7/2023 | Assouline et al. |

FOREIGN PATENT DOCUMENTS

| | | |
|---|---|---|
| CN | 109863532 A | 6/2019 |
| CN | 110168478 A | 8/2019 |
| CN | 106778453 B | 5/2020 |
| CN | 113689324 A | 11/2021 |
| EP | 2184092 A2 | 5/2010 |
| EP | 2983138 A1 | 2/2016 |
| EP | 3155560 B1 | 5/2020 |
| JP | 2001230801 A | 8/2001 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007089020 A1 | 8/2007 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2017132689 A1 | 8/2017 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |
| WO | WO-2023129372 A2 | 7/2023 |
| WO | WO-2023129373 A1 | 7/2023 |
| WO | WO-2023129441 A1 | 7/2023 |
| WO | WO-2023129442 A2 | 7/2023 |
| WO | WO-2023141146 A1 | 7/2023 |
| WO | WO-2023129372 A3 | 8/2023 |
| WO | WO-2023129442 A3 | 8/2023 |

OTHER PUBLICATIONS

"U.S. Appl. No. 17/566,070, Corrected Notice of Allowability dated Aug. 3, 2023", 4 pgs.

"U.S. Appl. No. 17/566,070, Non Final Office Action dated Feb. 16, 2023", 14 pgs.

"U.S. Appl. No. 17/566,070, Non Final Office Action dated May 3, 2023", 12 pgs.

"U.S. Appl. No. 17/566,070, Notice of Allowance dated Jul. 12, 2023", 7 pgs.

"U.S. Appl. No. 17/566,070, Response filed Jun. 26, 2023 to Non Final Office Action dated May 3, 2023", 11 pgs.

"International Application Serial No. PCT/US2022/052696, International Search Report dated Aug. 3, 2023", 5 pgs.

"International Application Serial No. PCT/US2022/052696, Invitation to Pay Additional Fees mailed Jun. 13, 2023", 5 pgs.

"International Application Serial No. PCT/US2022/052696, Written Opinion dated Aug. 3, 2023", 10 pgs.

"International Application Serial No. PCT/US2022/052700, International Search Report dated May 24, 2023", 5 pgs.

"International Application Serial No. PCT/US2022/052700, Invitation to Pay Additional Fees mailed Mar. 31, 2023", 11 pgs.

"International Application Serial No. PCT/US2022/052700, Written Opinion dated May 24, 2023", 11 pgs.

"International Application Serial No. PCT/US2022/053618, International Search Report dated May 10, 2023", 5 pgs.

"International Application Serial No. PCT/US2022/053618, Invitation to Pay Additional Fees mailed Mar. 22, 2023", 9 pgs.

"International Application Serial No. PCT/US2022/053618, Written Opinion dated May 10, 2023", 8 pgs.

"International Application Serial No. PCT/US2022/053622, International Search Report dated Jun. 23, 2023", 5 pgs.

"International Application Serial No. PCT/US2022/053622, Invitation to Pay Additional Fees mailed Apr. 28, 2023", 7 pgs.

"International Application Serial No. PCT/US2022/053622, Written Opinion dated Jun. 23, 2023", 10 pgs.

"International Application Serial No. PCT/US2023/011032, International Search Report dated May 23, 2023", 7 pgs.

(56) References Cited

OTHER PUBLICATIONS

"International Application Serial No. PCT/US2023/011032, Invitation to Pay Additional Fees mailed Mar. 28, 2023", 12 pgs.
"International Application Serial No. PCT/US2023/011032, Written Opinion dated May 23, 2023", 10 pgs.
Breen, D. E, et al., "Interactive occlusion and automatic object placement for augmented reality", Computer Graphics Forum : Journal of the European Association for Computer Graphics, Wiley-Blackwell, Oxford, vol. 15, No. 3, XP002515919, (Aug. 26, 1996), 11-22.
Liang, Mao, et al., "Deep Convolution Neural Networks for Automatic Eyeglasses Removal", 2nd International Conference on Artificial Intelligence and Engineering Applications, (Sep. 23, 2017), 8 pgs.
Roman, Suvorov, et al., "Resolution-robust Large Mask Inpainting with Fourier Convolutions", Arxiv.Org, Cornell University Library, 201 Olin Library Cornell University Ithaca, NY, (Sep. 15, 2021), 1-16.
Runfeldt, Melissa, "iSee: Using deep learning to remove eyeglasses from faces", [Online] Retrieved from the internet: <https://web.archive.org/web/20170515091918/https://blog.insightdatascience.com/isee-removing-eyeglasses-from-faces-using-deep-learning-d4e7d93537 6f>, (May 15, 2017), 8 pgs.
"U.S. Appl. No. 17/566,070, Notice of Allowance mailed Sep. 20, 2023", 8 pgs.
"U.S. Appl. No. 17/301,692, Non Final Office Action mailed Jan. 19, 2024", 23 pgs.

\* cited by examiner

OBJECT REPLACEMENT SYSTEM

TECHNICAL FIELD

The present disclosure generally relates to providing augmented reality experiences.

BACKGROUND

Augmented reality (AR) is a modification of a virtual environment. For example, in virtual reality (VR), a user is completely immersed in a virtual world, whereas in AR, the user is immersed in a world where virtual objects are combined or superimposed on the real world. An AR system aims to generate and present virtual objects that interact realistically with a real-world environment and with each other. Examples of AR applications can include single or multiple-player video games, instant messaging systems, and the like.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
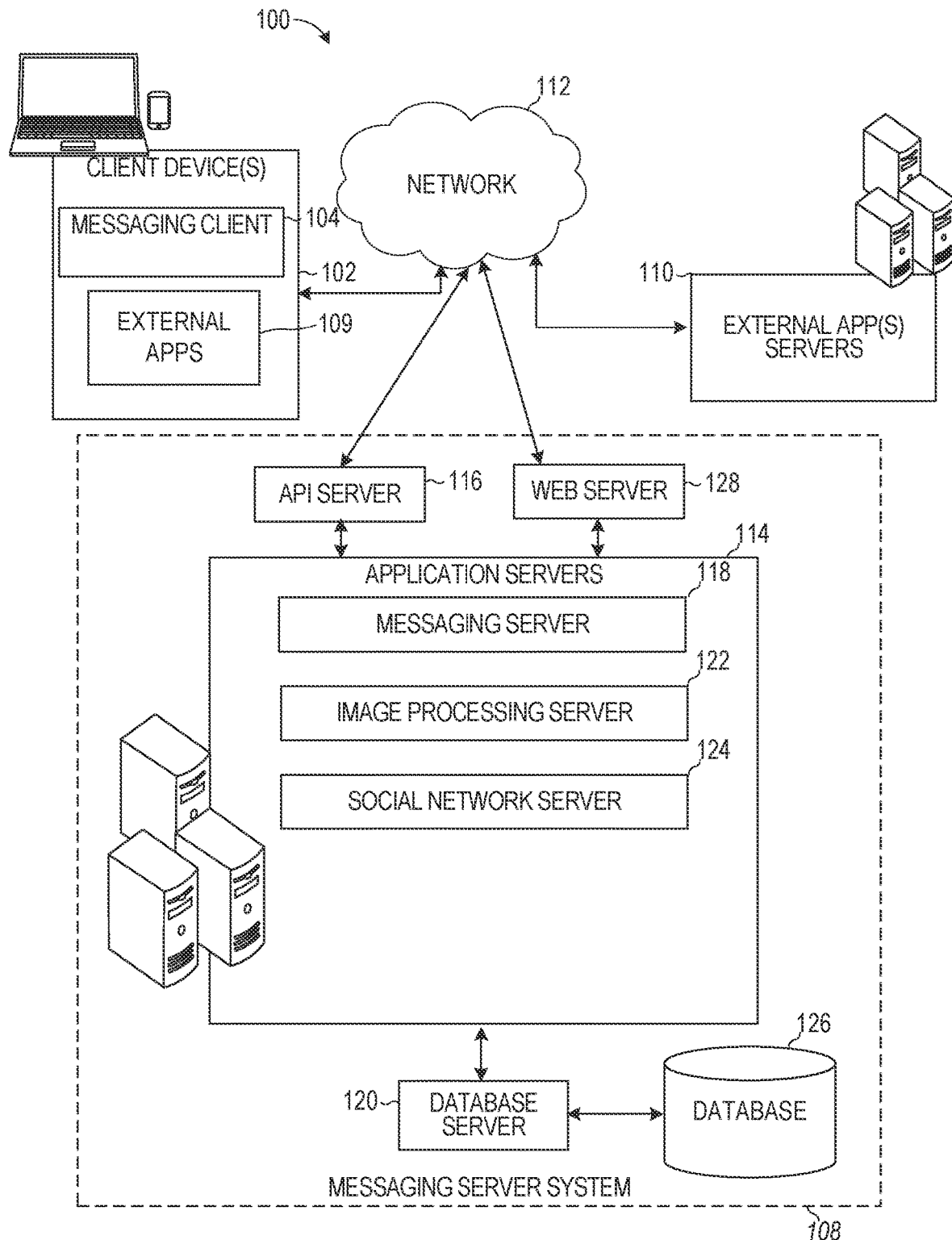
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Typically, virtual reality (VR) and augmented reality (AR) systems allow users to add augmented reality elements to their environment (e.g., captured image data corresponding to a user's surroundings). Some AR systems allow a user to virtually try on various goods, such as sunglasses and eyeglasses. However, these systems fail to account for real-world object (e.g., accessories a user is wearing) when the user is trying to virtually try on the goods. Specifically, if the user is already wearing glasses (or the real-world environment already includes a particular object) and requests to add AR sunglasses to the video depicting the user wearing glasses, the typical systems generate a display that depicts the user wearing both the real-world glasses and the AR sunglasses. These systems fail to intelligently detect the presence of a corresponding real-world accessory the user may be wearing that conflicts with a selected AR accessory. This results in an unrealistic display of content and distorts the illusion of AR content being present in the real-world environment. This results in wasted resources and detracts from the overall interest of using these systems.

The disclosed techniques improve the efficiency of using an electronic device that implements or otherwise accesses an AR/VR system by intelligently automatically detecting a real-world object (e.g., a facial accessory worn by a user, glasses, sunglasses, headgear, piercings, jewelry, necklace, earrings, hardware on a cabinet, a door on a house, a faucet on a sink, a wheel on a vehicle, eyeglasses, headgear, and so forth) included in a real-world environment depicted in a video feed or image and replacing such a real-world object with a selected AR object (e.g., an AR facial accessory, AR glasses, AR sunglasses, AR headgear, AR piercings, AR jewelry, AR necklace, AR earrings, AR hardware on a cabinet, AR door on a house, AR faucet on a sink, AR wheel on a vehicle, and so forth).

As an example, the user can be determined to be wearing real-world eyeglasses (or sunglasses) in an image or video and input can be received selecting to activate and present AR eyeglasses in an AR experience (e.g., a virtual eyeglasses or sunglasses try-on experience). In such cases, the disclosed techniques can generate a new image or video in which the real-world eyeglasses are removed from the depiction of the user and then the AR eyeglasses or sunglasses can be added to the new image or video. This results in a display of a user wearing the AR sunglasses or eyeglasses instead of the real-world eyeglasses (or sunglasses), which provides a better overall user experience. While the disclosed examples pertain to replacing real-world facial accessories with AR facial accessories, similar techniques can be applied to replacing any real-world object with a corresponding AR object. Some examples pertain to the replacements of real-world eyeglasses with AR sunglasses or AR sunglasses but similar techniques can be applied to the replacement of real-world sunglasses with AR sunglasses or AR sunglasses.

In some examples, the disclosed techniques receive an image (e.g., a frame of a video) that includes a depiction of a real-world environment (e.g., a face of a person) and process the image to obtain data indicating the presence of a real-world object (e.g., an accessory on the real-world face). The disclosed techniques can receive input that selects an AR object (e.g., an AR facial accessory (e.g., AR sunglasses)) and determine that the real-world object corresponds to the AR object. Namely, the disclosed techniques can determine that the real-world object included in the real-world environment depicted in the image conflict with the AR object because they are to be displayed or included on a same part of the real-world environment (e.g., the same part of the face). In such cases, the disclosed techniques apply a machine learning technique to the image to generate a new image that depicts the real-world environment (e.g., the real-world face of the person) without the real-world object and apply the AR object to the new image to generate a modified new image that depicts the real-world environment including the AR object instead of the real-world object (e.g., the person wearing the AR facial accessory instead of the real-world accessory).

In some examples, the machine learning technique is trained using training data that is generated based on synthetically created and paired images that depict environments with and without real-world objects (e.g., users wearing real-world accessories and not wearing the real-world accessories). For example, the disclosed techniques can generate the training data by sampling a latent code from a particular latent space first and then using it as a seed for a generative neural network to generate a first training image that depicts a first real-world environment. A latent code modification process is then applied to remove a given real-world object from the first real-world environment. The modified latent code is then used as a seed for the same generative neural network, producing an intermediate image that depicts the first real-world environment without the given real-world object. To ensure that only the area of interest is affected by the latent code modification, a segmentation model (e.g., a face segmentation model) is applied to the first training image to generate a binary image with a mask (e.g., a binary mask) corresponding to the given real-world object. Feature representations of the region of interest in the intermediate image, specified by the binary mask, are then combined with the feature representations of the first training image to generate a blended representation as a ground truth image corresponding to the first training image. The integrity of the ground truth image is verified by comparing attributes associated with the first training image and the ground truth image to form a pair of training images for training the machine learning technique.

In this way, the disclosed techniques can select and automatically display one or more AR elements (e.g., AR accessories) in the current image or video without conflicting with a real-world object depicted in the image or video. This improves the overall experience of the user in using the electronic device and reduces the overall amount of system resources needed to accomplish a task.

Networked Computing Environment

FIG. 1 is a diagrammatic representation of a networked environment of a messaging system 100 in which the present disclosure may be deployed, in accordance with some examples. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108, and external app(s) servers 110 via a network 112 (e.g., the Internet). A messaging client 104 can also communicate with locally-hosted third-party applications (also referred to as "external applications" and "external apps") 109 using Application Program Interfaces (APIs).

The client device 102 may operate as a standalone device or may be coupled (e.g., networked) to other machines. In a networked deployment, the client device 102 may operate in the capacity of a server machine or a client machine in a server-client network environment, or as a peer machine in a peer-to-peer (or distributed) network environment. The client device 102 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the disclosed operations. Further, while only a single client device 102 is illustrated, the term "client device" shall also be taken to include a collection of machines that individually or jointly execute the disclosed operations.

In some examples, the client device 102 can include AR glasses or an AR headset in which virtual content is displayed within lenses of the glasses while a user views a real-world environment through the lenses. For example, an image can be presented on a transparent display that allows a user to simultaneously view content presented on the display and real-world objects.

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video, or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The API server 116 receives and transmits message data (e.g., commands and message payloads) between the client device 102 and the application servers 114. Specifically, the API server 116 provides a set of interfaces (e.g., routines and protocols) that can be called or queried by the messaging client 104 in order to invoke functionality of the application servers 114. The API server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118. In some examples, any or all of the operations discussed as being performed by the image processing server 122 can be similarly (or alternatively) performed locally by the client device 102.

Figure 2:
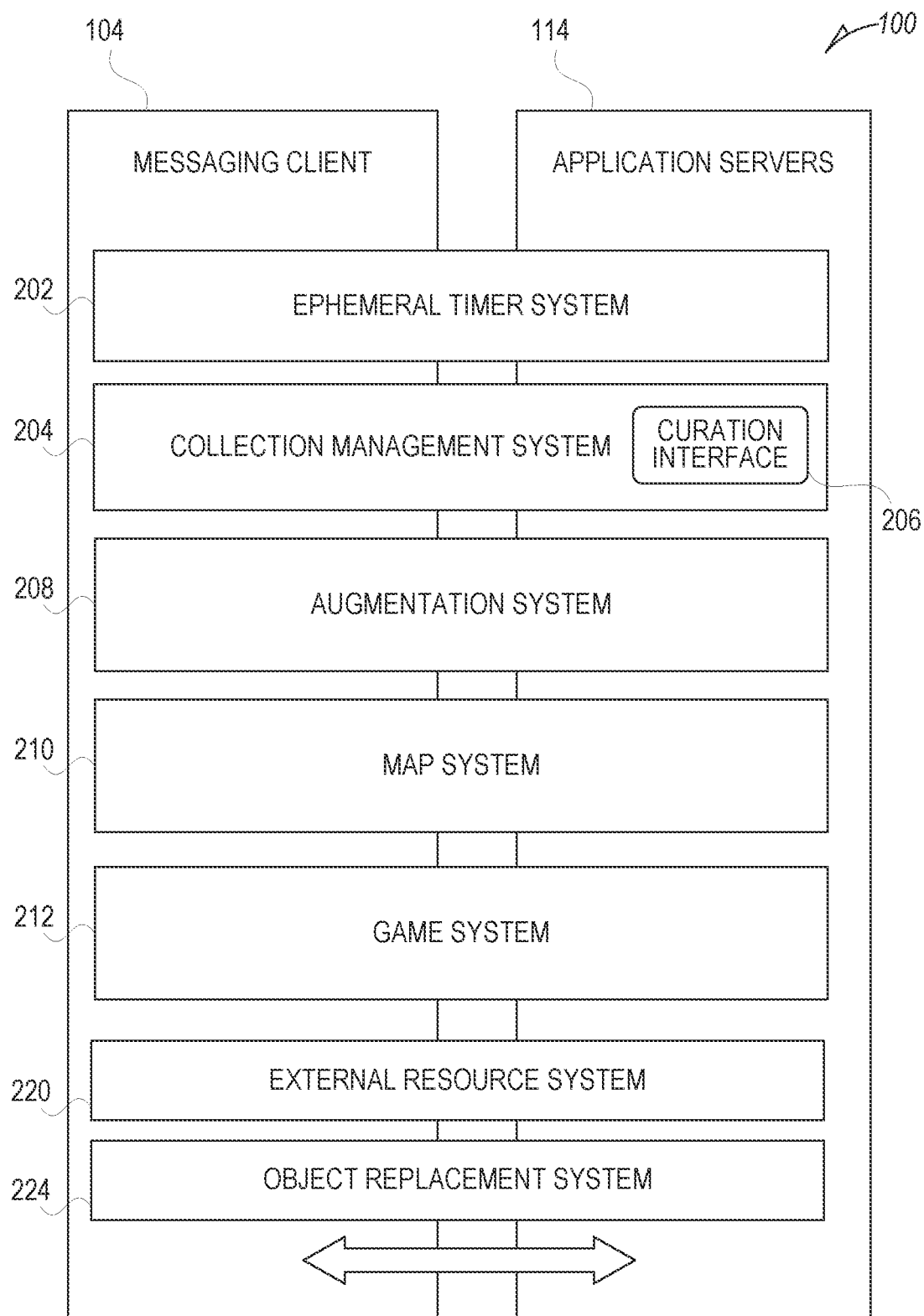
FIG. 2 is a block diagram illustrating further details regarding the messaging system, according to some examples.

Image processing server 122 is used to implement scan functionality of the augmentation system 208 (shown in FIG. 2). Scan functionality includes activating and providing one or more augmented reality experiences on a client device 102 when an image is captured by the client device 102. Specifically, the messaging client 104 on the client device 102 can be used to activate a camera. The camera displays one or more real-time images or a video to a user along with one or more icons or identifiers of one or more augmented reality experiences. The user can select a given one of the identifiers to launch the corresponding augmented reality experience or perform a desired image modification (e.g., launching an AK shopping experience, as discussed in connection with FIGS. 5-9 below).

Figure 3:
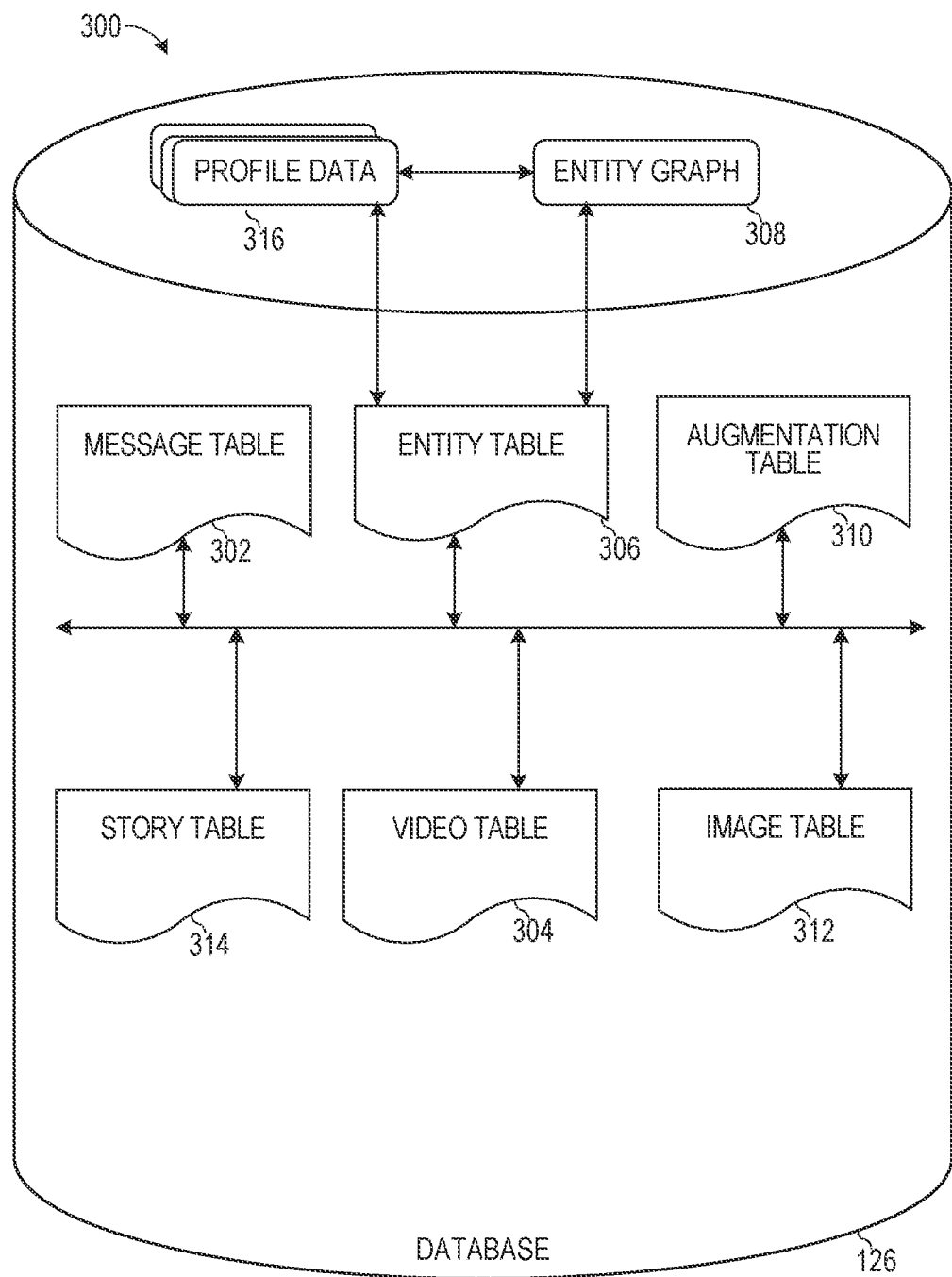
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or apples) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on external resource or app(s) servers 110). The small-scale version of the third-party application includes a subset of features and functions of the third-party application (e.g., the full-scale, native version of the third-party standalone application) and is implemented using a markup-language document. In some examples, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language .*js file or a .json file) and a style sheet (e.g., a .*ss file).

In response to receiving a user selection of the option to launch or access features of the external resource (e.g., external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from an external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external applications 109 (or applets) can vary based on how the menu is launched by the user (e.g., from a conversation interface or from a non-conversation interface).

System Architecture

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the server-side by the application servers 114. These subsystems include, for example, an ephemeral timer system 202, a collection management system 204, an augmentation system 208, a map system 210, a game system 212, an external resource system 220, and an object replacement system 224.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain augmented reality experiences and presents identifiers of such experiences in one or more user interfaces (e.g., as icons over a real-time image or video or as thumbnails or icons in interfaces dedicated for presented identifiers of augmented reality experiences). Once an augmented reality experience is selected, one or more images, videos, or augmented reality graphical elements are retrieved and presented as an overlay on top of the images or video captured by the client device 102. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

In other examples, the augmentation system 208 is able to communicate and exchange data with another augmentation system 208 on another client device 102 and with the server via the network 112. The data exchanged can include a session identifier that identifies the shared AR session, a transformation between a first client device 102 and a second client device 102 (e.g., a plurality of client devices 102 include the first and second devices) that is used to align the shared AR session to a common point of origin, a common coordinate frame, functions (e.g., commands to invoke functions) as well as other payload data (e.g., text, audio, video, or other multimedia data).

The augmentation system 208 sends the transformation to the second client device 102 so that the second client device 102 can adjust the AR coordinate system based on the transformation. In this way, the first and second client devices 102 synchronize up their coordinate systems and frames for displaying content in the AR session. Specifically, the augmentation system 208 computes the point of origin of the second client device 102 in the coordinate system of the first client device 102. The augmentation system 208 can then determine an offset in the coordinate system of the second client device 102 based on the position of the point of origin from the perspective of the second client device 102 in the coordinate system of the second client device 102. This offset is used to generate the transformation so that the second client device 102 generates AR content according to a common coordinate system or frame as the first client device 102.

The augmentation system 208 can communicate with the client device 102 to establish individual or shared AR sessions. The augmentation system 208 can also be coupled to the messaging server 118 to establish an electronic group communication session (e.g., group chat, instant messaging) for the client devices 102 in a shared AR session. The electronic group communication session can be associated with a session identifier provided by the client devices 102 to gain access to the electronic group communication session and to the shared AR session. In some examples, the client devices 102 first gain access to the electronic group communication session and then obtain the session identifier in the electronic group communication session that allows the client devices 102 to access to the shared AR session. In some examples, the client devices 102 are able to access the shared AR session without aid or communication with the augmentation system 208 in the application servers 114.

The map system 210 provides various geographic location functions, and supports the presentation of map-based media content and messages by the messaging client 104. For example, the map system 210 enables the display of user icons or avatars (e.g., stored in profile data 316, shown in FIG. 3) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

In some cases, the augmentation system 208 communicates with an object replacement system 224 to generate a new image or video that includes a depiction of an AR object (e.g., an AR accessory on a user's face). For example, the object replacement system 224 receives an image or video from a client device 102 that depicts a real-world environment including a real-world object (e.g., a face of a person wearing one or more real-world accessories (e.g., eyeglasses, sunglasses, a hat, headgear, piercings, earrings, a necklace, and so forth)). The object replacement system 224 detects the one or more real-world object depicted in the image or video. The object replacement system 224 can receive input from a user selecting a particular AR experience (e.g., a virtual try-on experience). The particular AR experience can include instructions for rendering presentation of a particular AR object (e.g., an AR facial accessory (e.g., AR eyeglasses, AR sunglasses, AR hat, AR headgear, AR piercings, AR earrings, AR necklace, and so forth)).

In some examples, the object replacement system 224 determines that the AR facial accessory (or AR object) corresponds to a real-world accessory worn by the person (e.g., a real-world object depicted in the real-world environment). For example, the object replacement system 224 can determine that both the AR facial accessory and the real-world accessory are classified as objects worn on a particular portion of a face, such as in front of eyes of a person (in the case of glasses) or on ears of the person (in the case of earrings). In response, the object replacement system 224 applies a trained machine learning technique to the received image or video to remove the real-world accessory being worn by the person that corresponds to the AR facial accessory. Then, the object replacement system 224 modifies pixel data of the image or video in which the real-world accessory (or real-world object) has been removed to add the AR facial accessory (or AR object) to the image or video. In this way, the real-world object (e.g., real-world accessory) can be removed from the image or video to avoid conflict with the corresponding AR object AR accessory). The object replacement system 224 can then place the AR object (e.g., AR accessory) on top of where the real-world object was previously positioned. This allows the user to see how the AR object (e.g., AR accessory) looks on the environment (e.g., the person's face) as a replacement for the real-world object. An illustrative implementation of the object replacement system 224 is shown and described in connection with FIG. 5 below.

The object replacement system 224 is a component that can be accessed by an AR/VR application implemented on the client device 102. The AR/VR application uses an RGB camera to capture an image of a room in a home. The AR/VR application applies various trained machine learning techniques on the captured image of the person to detect real-world accessories or object and remove one or more real-world accessories or object. In some implementations, the AR/VR application continuously captures images of the environment or person's face in real-time or periodically to continuously or periodically update the AR representations of objects or accessories. This allows the user to move around in the real world and see updated AR accessories or objects in real-time.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, are described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

The database 126 can also store data pertaining to individual and shared AR sessions. This data can include data communicated between an AR session client controller of a first client device 102 and another AR session client controller of a second client device 102, and data communicated between the AR session client controller and the augmentation system 208. Data can include data used to establish the common coordinate frame of the shared AR scene, the transformation between the devices, the session identifier, images depicting a body, skeletal joint positions, wrist joint positions, feet, and so forth.

Filters, in some examples, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying augmented reality experiences). An augmented reality content item or augmented reality item may be a real-time special effect and sound that may be added to an image or a video.

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two-dimensional or three-dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such a method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search is started for landmarks from the mean shape aligned to the position and size of the face determined by a global face detector. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browsing to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus).

As mentioned above, the video table 304 stores video data that, in some examples, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

The data structures 300 can also store training data for training one or more machine learning techniques (models) to remove a real-world object (e.g., a real-world facial accessory) from an image or video. The training data can include a plurality of images and videos and their paired corresponding ground-truth images. For example, a first image or video can depict an environment including a real-world object (e.g., a person wearing a real-world accessory (e.g., real-world glasses)) and the corresponding ground-truth image or video can depict the same environment without the real-world object (e.g., the person not wearing the real-world accessory). In some examples, the ground-truth image is generated as a synthesized image based on the first image or video and using one or more additional machine learning techniques. The images and videos can include a mix of all sorts of real-world accessories or object. Various machine learning techniques can be trained to remove or generate new images or videos that depict a same environment without the object (e.g., the person not wearing a particular real-world accessory). For example, a first machine learning technique can be trained based on a first set of data that includes paired images depicting users wearing real-world sunglasses and not wearing the real-world sunglasses. The first machine learning technique can process an image or video to remove real-world sunglasses depicted as being worn on a person's face. A second machine learning technique can be trained based on a second set of data that includes paired images depicting users wearing real-world earrings and not wearing the real-world earrings. The second machine learning technique can process an image or video to remove real-world earrings depicted as being worn on a person's face.

Data Communications Architecture

Figure 4:
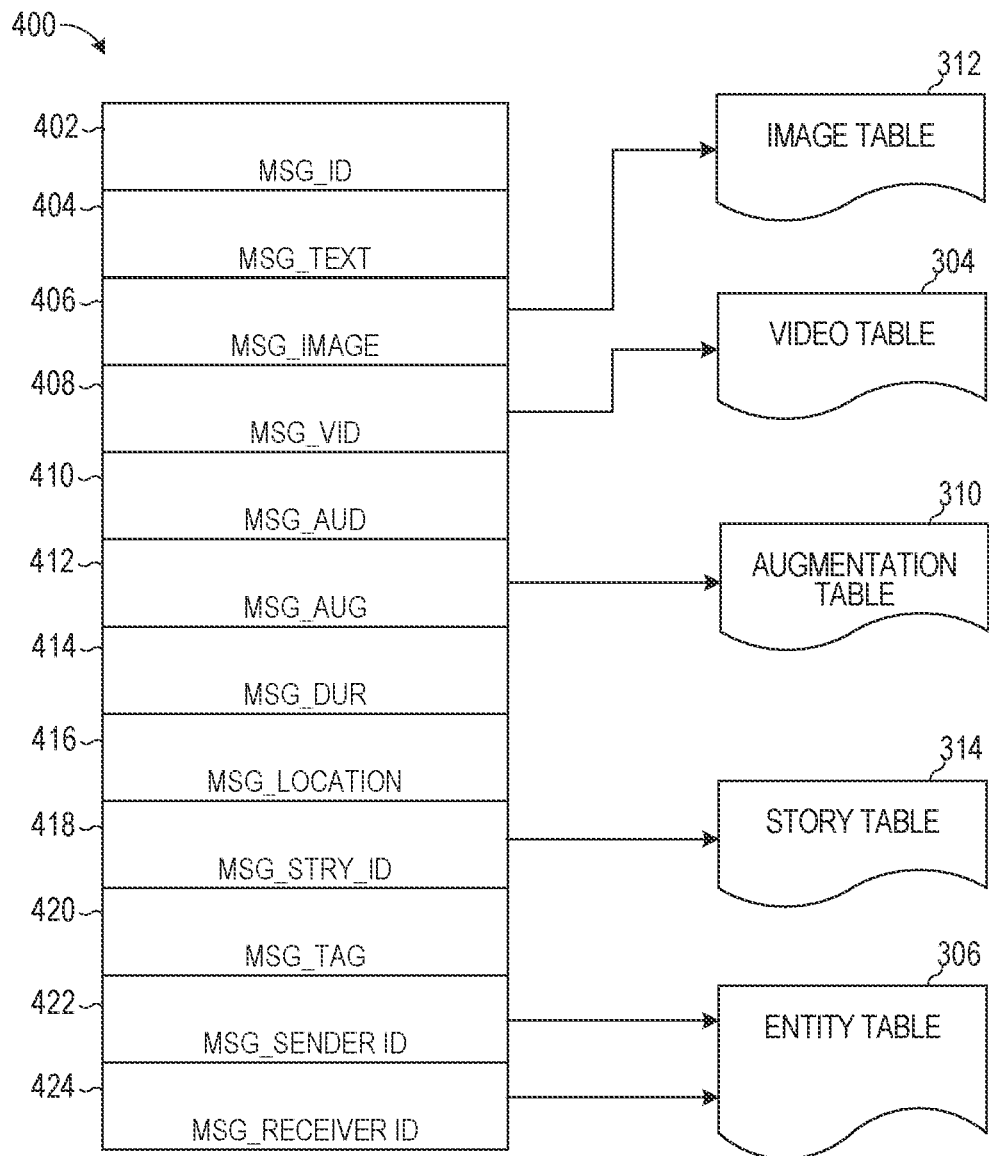
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 312.

message video payload 408: video data, captured by a camera component or retrieved from a memory component of the client device 102, and that is included in the message 400. Video data for a sent or received message 400 may be stored in the video table 304.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data 412 for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Object Replacement System

Figure 5:
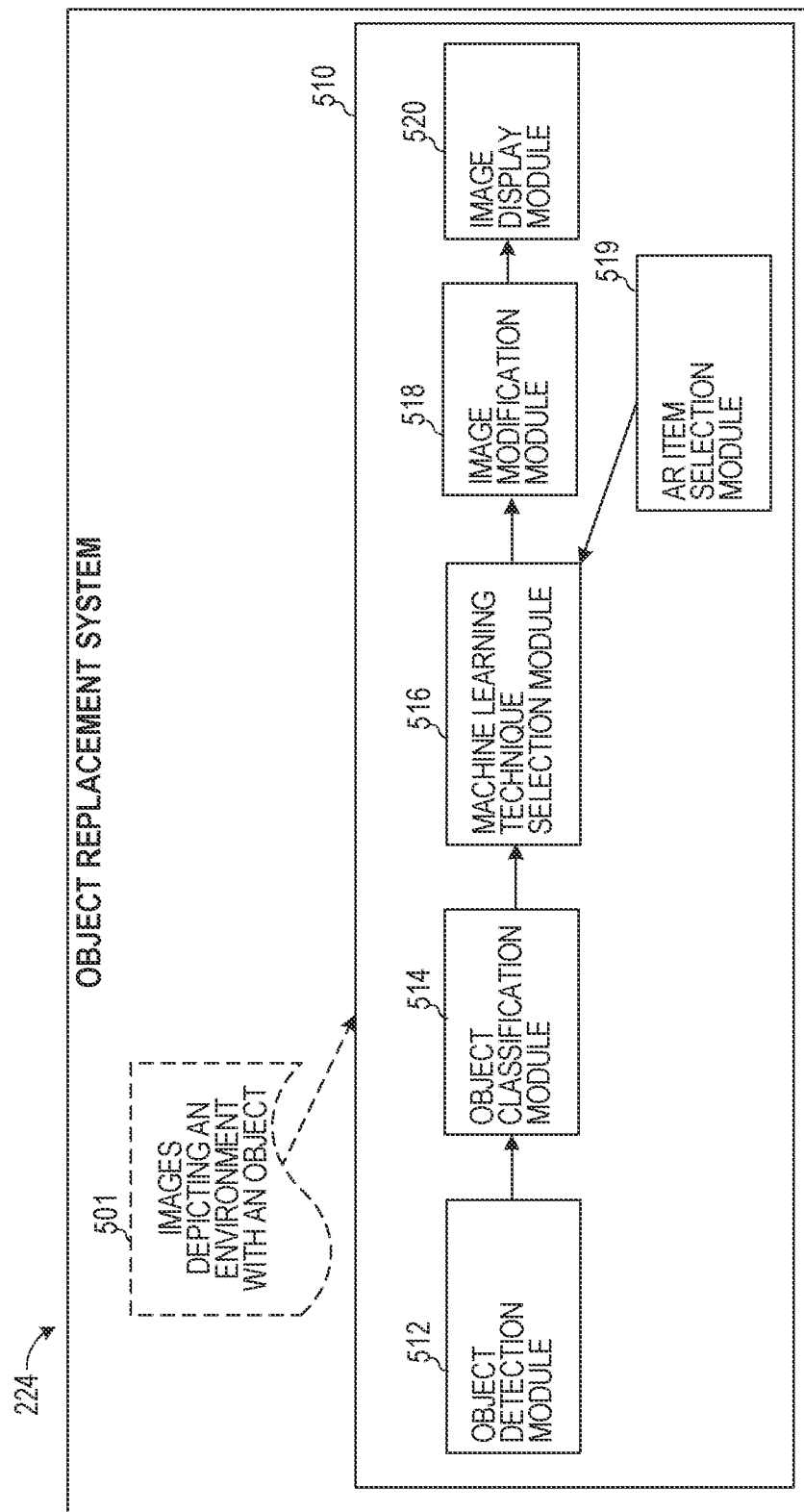
FIG. 5 is a block diagram showing an example object replacement system, according to some examples.

FIG. 5 is a block diagram showing an example object replacement system 224, according to some examples. The object replacement system 224 includes a set of components 510 that operate on a set of input data (e.g., a monocular image (or video) depicting an environment including an object 501 (e.g., a person wearing an accessory (e.g., a facial accessory, such as glasses, headwear, piercings, earrings, necklace, and so forth)). The object replacement system 224 includes an object detection module 512, an object classification module 514, a machine learning technique selection module 516, an image modification module 518, an AR item selection module 519, and an image display module 520. All or some of the components 510 of the object replacement system 224 can be implemented by a server, in which case, the monocular image depicting an environment including the object 501 is provided to the server by the client device 102. In some cases, some or all of the components 510 of the object replacement system 224 can be implemented by the client device 102.

The object detection module 512 receives a monocular image (or video) depicting an environment (e.g., a person wearing an accessory). This image can be received as part of a real-time video stream, a previously captured video stream, or a new image captured by a (front-facing or rear-facing) camera of the client device 102. The object detection module 512 processes the image, such as using a trained machine learning technique, to detect one or more real-world objects included in the environment (e.g., an accessory worn by the person depicted in the image). For example, the object detection module 512 can segment out individual objects in the image and assign a label or name to the individual objects. Specifically, the object detection module 512 can recognize a face as an individual object and objects on the face, such as piercings, glasses, earrings, a necklace, a hat, or headgear using a machine learning technique. In some examples, the machine learning technique is trained to receive features extracted from an image and compute probabilities that each set of features correspond to a particular object or object type. The machine learning technique provides this output to the object detection module 512, which then selects each accessory feature with a highest probability as the detected real-world accessory depicted in the image or video.

The object detection module 512 provides the identified and recognized real-world accessory features to the object classification module 514. The object classification module 514 can compute or determine a real-world object classification of the real-world objects depicted in the image or video. In some implementations, the object classification module 514 can use features provided by the object detection module 512 for each object to assign a label or classification to each detected object. For example, features that represent an object in front of a user's eyes can be associated with an eyeglasses classification. Features that represent an object on a user's ears can be associated with an earrings classification. Features that represent an object on top of a user's head can be associated with a headgear classification. Features that represent an object on a user's neck can be associated with a necklace classification.

In another implementation, the object classification module 514 can implement one or more machine learning techniques to classify a real-world object and generate a label to a set of features representing a real-world object. The machine learning techniques can implement a classifier neural network that is trained to establish a relationship between one or more features of an image or video of a real-world accessory with a corresponding real-world object classification.

The labeled real-world object (e.g., facial accessory) are provided to the machine learning technique selection module 516. The machine learning technique selection module 516 also communicates with an AR item selection module 519 to receive input from a user that selects a given AR experience. For example, the AR item selection module 519 can present a user interface to a user that lists various types of accessory try-on AR experiences. The AR item selection module 519 receives a user selection of a particular try-on AR experience, such as a glasses AR try-on experience. The AR item selection module 519 retrieves an AR object (e.g., AR facial accessory, such as AR glasses) corresponding to the selected AR experience. The AR item selection module 519 also determines a classification associated and stored with the selected AR experience.

The AR item selection module 519 provides the classification associated with the selected AR experience to the machine learning technique selection module 516. The machine learning technique selection module 516 determines that the classification associated with the selected AR experience matches a classification of one of the real-world objects detected and classified by the object classification module 514. In response to determining that the classification associated with the selected AR experience matches the classification of one of the real-world objects included in the environment (e.g., the accessory worn by the person depicted in the image or video), the machine learning technique selection module 516 selects a particular machine learning technique that has been trained to remove the real-world object from the image or video.

Specifically, multiple machine learning techniques can be trained and stored as part of the machine learning technique selection module 516. Each machine learning technique can be configured to receive an image or video depicting an environment including an object (e.g., a person wearing a given type of real-world accessory) and generate a new image or video depicting the environment without the object (e.g., person not wearing or without the given type of real-world accessory). For example, a first machine learning technique can be trained based on a first set of data that includes paired images depicting users wearing real-world sunglasses and not wearing the real-world sunglasses. The first machine learning technique can process an image or video to remove real-world sunglasses depicted as being worn on a person's face. A second machine learning technique can be trained based on a second set of data that includes paired images depicting users wearing real-world earrings and not wearing the real-world earrings. The second machine learning technique can process an image or video to remove real-world earrings depicted as being worn on a person's face.

During training, a given one of the machine learning techniques receives a given training image (e.g., a monocular image or video depicting a person wearing a real-world accessory, such as a person wearing eyeglasses) from training image data stored in data structures 300. The given training image is paired with a ground truth training image that depicts the person not wearing the real-world accessory (e.g., depicts the same person without the eyeglasses). The machine learning technique selection module 516 applies the given one of the machine learning techniques on the given training image. The machine learning technique selection module 516 extracts one or more features from the given training image and applies a U-Net type of network to generate a new image that depicts the same person not wearing the real-world accessory.

The machine learning technique selection module 516 obtains the ground truth image of the person not wearing the real-world accessory that is paired with the given training image. The machine learning technique selection module 516 compares the generated new image with the ground truth image to compute a deviation or difference. Based on a difference threshold (even if the threshold is below a certain value or is substantially small) of the comparison or the deviation, the machine learning technique selection module 516 updates one or more coefficients or parameters and obtains one or more additional paired training images of persons wearing and not wearing real-world accessories. In some cases, the machine learning technique selection module 516 is first trained on a set of images associated with one real-world accessory and is then trained on another set of images associated with another real-world accessory. In some examples, multiple models can be trained and included as part of the machine learning technique selection module 516, where each of the multiple models is trained on a different type of real-world object or accessory. For example, a first model (e.g., neural network) can be trained on a first set of images or videos that depict a real-world environment with a given real-world object of a first type (e.g., a car with one or more wheels) that are paired with ground-truth images or videos that depict the real-world environment without the given real-world object of the first type (e.g., the car without the one or more wheels). For example, a second model (e.g., neural network) can be trained on a second set of images or videos that depict a real-world environment with a given real-world object of a second type (e.g., a person wearing an accessory, such as eyeglasses) that are paired with ground-truth images or videos that depict the real-world environment without the given real-world object of the second type (e.g., the person not wearing the accessory).

After a specified number of epochs or batches of paired training images have been processed and/or when a difference threshold (computed as a function of a difference between the generated images and the corresponding ground-truth images) reaches a specified value, the machine learning technique selection module 516 completes training, and the parameters and coefficients of the machine learning technique selection module 516 are stored as a trained machine learning technique.

In some cases, multiple machine learning techniques are trained in parallel or sequentially on different sets of training data corresponding to different real-world accessories. For example, a first machine learning technique can be trained to generate or estimate a new image depicting a user not wearing glasses based on a first set of training images that depict a person wearing and the person not wearing glasses. A second machine learning technique can be trained to generate a new image depicting a user not wearing earrings based on a second set of training images that depict a person wearing and the person not wearing earrings. A third machine learning technique can be trained to generate a new image depicting a user not wearing piercings based on a third set of training images that depict a person wearing and the person not wearing piercings. A fourth machine learning technique can be trained to generate a new image depicting a user not wearing headgear based on a fourth set of training images that depict a person wearing and the person not wearing headgear. A fifth machine learning technique can be trained to generate a new image depicting a user not wearing a necklace based on a fifth set of training images that depict a person wearing and the person not wearing the necklace. A sixth machine learning technique can be trained to generate a new image depicting an environment without a particular object based on a sixth set of training images that depict an environment with and without the particular object.

In an example, after training, the machine learning technique selection module 516 receives an input monocular image depicting an environment with an object (e.g., a person wearing a particular real-world accessory) as a single RGB image from a client device 102 or as a video of multiple images. The machine learning technique selection module 516 applies the trained machine learning technique(s) to the received input image to generate a new image that depicts the same environment without the particular object (e.g., the person not wearing the particular real-world accessory) (e.g., the new image fails to depict or excludes a depiction of the real-world accessory or object).

In some cases, the machine learning technique selection module 516 can implement compact image-to-image networks that correspond to each of the plurality of machine learning techniques stored by the machine learning technique selection module 516. For example, after the machine learning technique selection module 516 trains a first machine learning technique, the machine learning technique selection module 516 can train a compact counterpart to the first machine learning technique (e.g., a compact image-to-image network). In some examples, the machine learning technique selection module 516 uses knowledge distillation with perceptual loss from the training images used to train the first machine learning technique and the parameters of the first machine learning technique to train the compact counterpart to the first machine learning technique. The compact counterpart to the first machine learning technique can then be implemented and run on a client device 102 more efficiently and with the consumption of fewer resources than the first machine learning technique. This reduces the amount of resources and conserves battery power of the client device 102 when performing the disclosed techniques to render an AR accessory for display on an image depicting a person wearing a real-world accessory that has been removed.

The machine learning technique selection module 516 provides the new image that depicts the environment without the object (e.g., the person not wearing the particular type of real-world accessory) to the image modification module 518. The image modification module 518 also receives the AR object (e.g., AR facial accessory) from the AR item selection module 519 (e.g., directly or via the machine learning technique selection module 516). The image modification module 518 adds a depiction of the AR object to the new image or video, such as in the same place or proximate to the location where the real-world object was removed. For example, the image modification module 518 modifies pixel data of the real-world environment (face) to add the AR object to the image or video. The image modification module 518 then instructs the image display module 520 to display the AR object with the new image or video to make it appear as though the AR object has replaced the real-world object.

The image modification module 518 can receive input from a user that drags or moves the AR object (e.g., AR facial accessory) to a new position or placement in the image or video. In response, the image modification module 518 moves or modifies the position of the AR object on the new image or video that depicts the environment without the real-world object (e.g., the person not wearing the real-world accessory) (e.g., the image or video in which the real-world object has been removed).

In some examples, the image modification module 518 receives a video that depicts a user moving a particular type of real-world accessory in close proximity to the user's face. For example, the user can hold a pair of glasses and can place the glasses on the user's face. The object replacement system 224 receives the video, and as the glasses approach the face, the object replacement system 224 begins applying the machine learning technique to remove a depiction of the glasses from the image or video. In an example, the object replacement system 224 can represent this removal by gradually fading away the real-world glasses as they come closer and closer in proximity to the user's face (the depiction of the real-world glasses in the video gradually fades away). Once the glasses are placed on top of the user's face, such as in front of the user's eyes, the object replacement system 224 removes the depiction of the glasses and renders a video that depicts the user not wearing the real-world glasses. The object replacement system 224 can receive input that selects an AR facial accessory, such as AR glasses, and adds the selected AR facial accessory to the video in place of the real-world glasses.

In some examples, the object replacement system 224 generates the paired training data sets for training the disclosed machine learning techniques. In such cases, the object replacement system 224 can train a set of attribute extractors on human faces, such as to detect one or more attributes including object detection (e.g., presence of glasses, a hat, and so forth), one or more demographics of a person (e.g., age, gender, diversity group, and so forth) or criteria or attributes of the real-world environment, lighting information, scene illumination (involving checking that the lighting conditions do not change after editing, such as by using a neural network), face pose information including Euler angles from landmarks, and facial expression and identity information (e.g., blendshapes weights from landmarks).

The object replacement system 224 can generate a synthetic dataset of training images by processing a collection of training images that depicts an environment with a particular object (e.g., a person wearing a particular accessory). For example, a first dataset can be generated that includes paired training images that depict a person wearing glasses and that depict the same person not wearing glasses. In some examples, to generate the first dataset, the object replacement system 224 can search a collection of training images to find or identify a set of images that are associated with an attribute that indicates the presence of a particular object (e.g., glasses) (e.g., the set of images includes a depiction of a person wearing glasses). The object replacement system 224 then selects a given image in the set of images to perform semantic editing by changing a value of an attribute corresponding to the object (e.g., glasses) from being present to not being present. In some examples, to generate the first dataset, the object replacement system 224 can apply a particular latent code modification procedure to synthetically generate a set of images (or one or more images or videos) that are associated with an attribute that indicates the presence of a particular object (e.g., glasses) (e.g., the set of images includes a depiction of a person wearing glasses). Specifically, the object replacement system 224 can generate the first set of images by sampling a latent code from a particular latent space first and then using it as a seed for a generative neural network to generate the first set of image that depict a first real-world environment.

The object replacement system 224 then performs semantic editing by changing a value of an attribute corresponding to the object (e.g., glasses) from being present to not being present and regenerates a new set of training image in which the object is removed, for example by applying a latent code modification process and using the modified latent code as a seed for the same generative neural network to produce the new set of training images (e.g., one or more intermediate images).

Specifically, the object replacement system 224 can render or synthetically generate an intermediate image that depicts the real-world environment without the real-world object (e.g., the person not wearing the glasses). The object replacement system 224 then changes the latent code on layers 2-4, for example, to remove the object (e.g., glasses) from being present. In some examples, the object replacement system 224 uses a face or object segmentation model on the given image to obtain a binary image with a glasses or object mask (e.g., a binary mask corresponding to the real-world object). The object replacement system 224 uses the original and modified latent code to obtain feature representations of the real-world environment including and not including the particular object (e.g., person wearing and not wearing glasses).

The object replacement system 224 applies the object mask (e.g., glasses mask) on the intermediate image to obtain a set of features corresponding to a region of interest (e.g., the location in the image where the object (e.g., glasses) (or other real-world accessory) have been removed). The object replacement system 224 copies the obtained set of features using the glasses or object or binary mask from the intermediate image and replaces the same set of features in the given image with the copied set of features. Namely, the object replacement system 224 replaces features pixels) at the locations of the glasses or object mask in the original image given of the environment with the object (e.g., the person wearing the real-world glasses) with the corresponding features e.g., pixels) obtained from the intermediate image that depicts the environment without the object (e.g., the person not wearing the real-world glasses). In this way, artifacts that are located outside of the area of interest are excluded while preserving the artifacts within the area of interest. Then, after modifying the original given image with the features from the intermediate image, the object replacement system 224 stores this modified original image as the ground truth image corresponding to the original unmodified given image.

In some examples, prior to storing the pair of images, the object replacement system 224 applies a verification process on the ground truth image to verify integrity of the ground truth image. Namely, the object replacement system 224 can apply an attribute classifier on the original given image and the ground truth image to obtain a set of attributes for each image (a first set of attributes for the original given image and a second set of attributes for the ground truth image). The object replacement system 224 determines whether one or more verification criteria are satisfied by the first and second sets of attributes. In response to determining that the one or more verification criteria are satisfied, the object replacement system 224 generates and stores the two images as paired training data.

In some examples, the one or more verification criteria are satisfied in response to one or more conditions being met. The conditions can include a determination that the second set of attributes indicates that the image does not include the real-world glasses or objects (e.g., absence of the real-world glasses) and that the first set of attributes indicates that the image includes the real-world glasses. The conditions can include a determination that a demographic (e.g., age group, diversity group, and/or gender) defined by the second set of attributes match the demographic defined by the first set of attributes or attribute or criteria of the environment. The conditions can include a determination that a pose and/or facial expression defined by the second set of attributes match the pose and/or facial expression defined by the first set of attributes. The conditions can include a determination that a scene illumination defined by the second set of attributes match the scene illumination defined by the first set of attributes. If any or a subset of these conditions is not met, the ground truth image is not paired with the given training image, and another image is selected for synthesizing a ground truth image from the set of images.

In some cases, the object replacement system 224 counts the number of paired images that are associated with an attribute indicating a particular demographic (e.g., a particular age group). In response to determining that the number of paired images associated with a first demographic exceeds by more than a threshold (e.g., is not equal to) the number of paired images associated with a second demographic, the object replacement system 224 obtains a given image associated with the second demographic. The object replacement system 224 then generates a new pair of images for the second demographic until the quantity of paired images associated with the first demographic is within a threshold amount or quantity of paired images associated with the second demographic.

Figure 6:
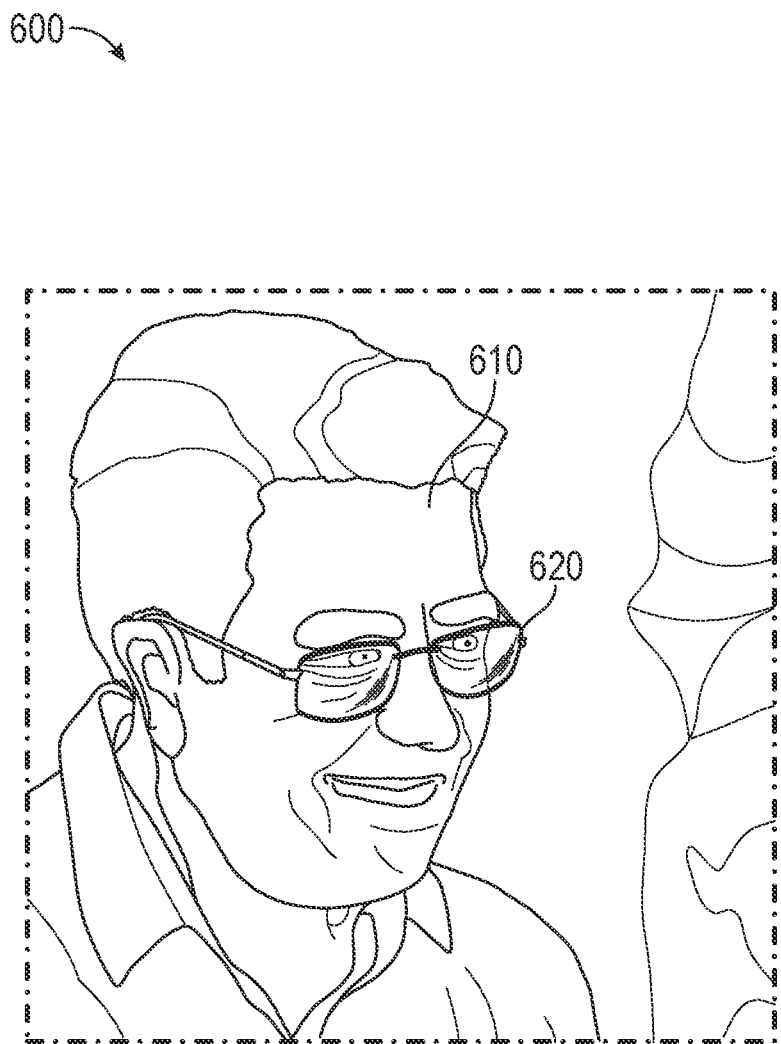
FIGS. 6 and 7 are diagrammatic representations of outputs of the object replacement system, in accordance with some examples.
Figure 7:
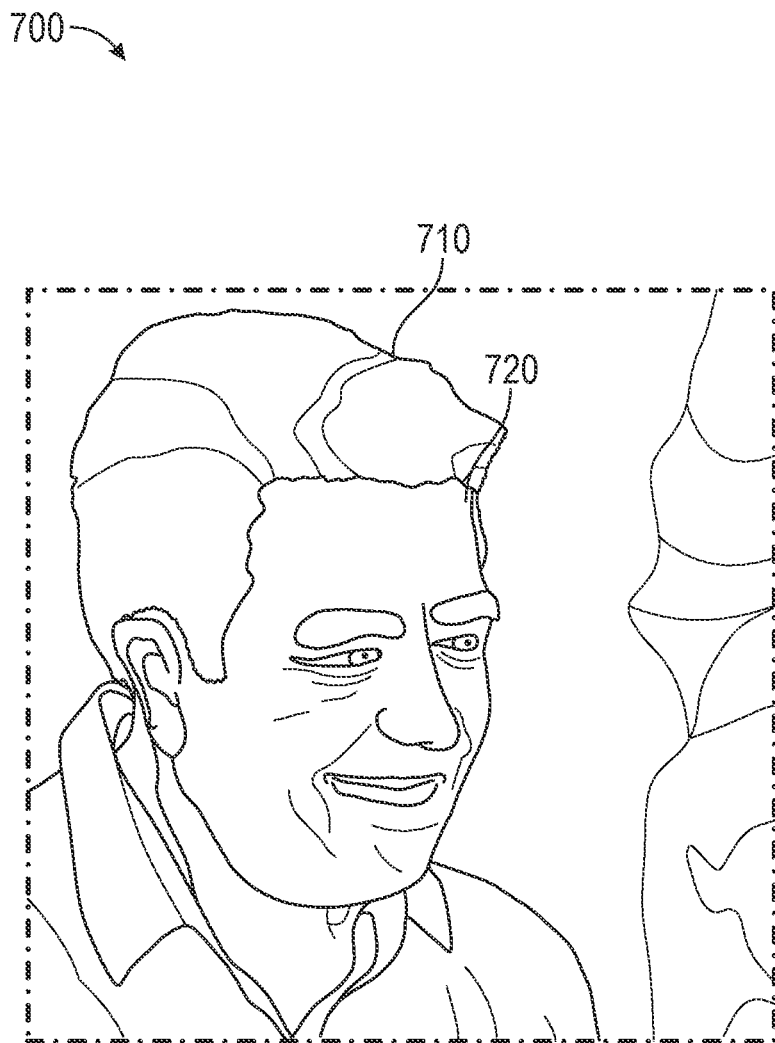

FIGS. 6 and 7 are diagrammatic representations of outputs of the object replacement system 224, in accordance with some examples. Specifically, as shown in the user interface 600 of FIG. 6, the object replacement system 224 receives an image or video that depicts a person's face 610. The object replacement system 224 detects the presence of a real-world accessory 620 (e.g., eyeglasses) in the image or video that depicts the person's face 610. The object replacement system 224 receives input that selects an AR facial accessory corresponding to the real-world accessory 620. In response, the object replacement system 224 applies one or more machine learning techniques to generate or estimate a new image or video in which the real-world accessory 620 is removed. For example, the object replacement system 224 generates and displays a user interface 700 of FIG. 7. The user interface 700 displays an image or video rendered by the machine learning techniques. The image or video depicts a person's face 710, which is the same as the person's face 610 (FIG. 6). The image or video that is generated excludes or no longer depicts the real-world accessory 620. Namely, the region 720 corresponding to where the real-world accessory 620 was previously depicted no longer depicts the real-world accessory 620. The object replacement system 224 can now overlay a depiction of the AR facial accessory selected by the user without interfering or overlapping with a depiction of the real-world accessory 620.

Figure 8:
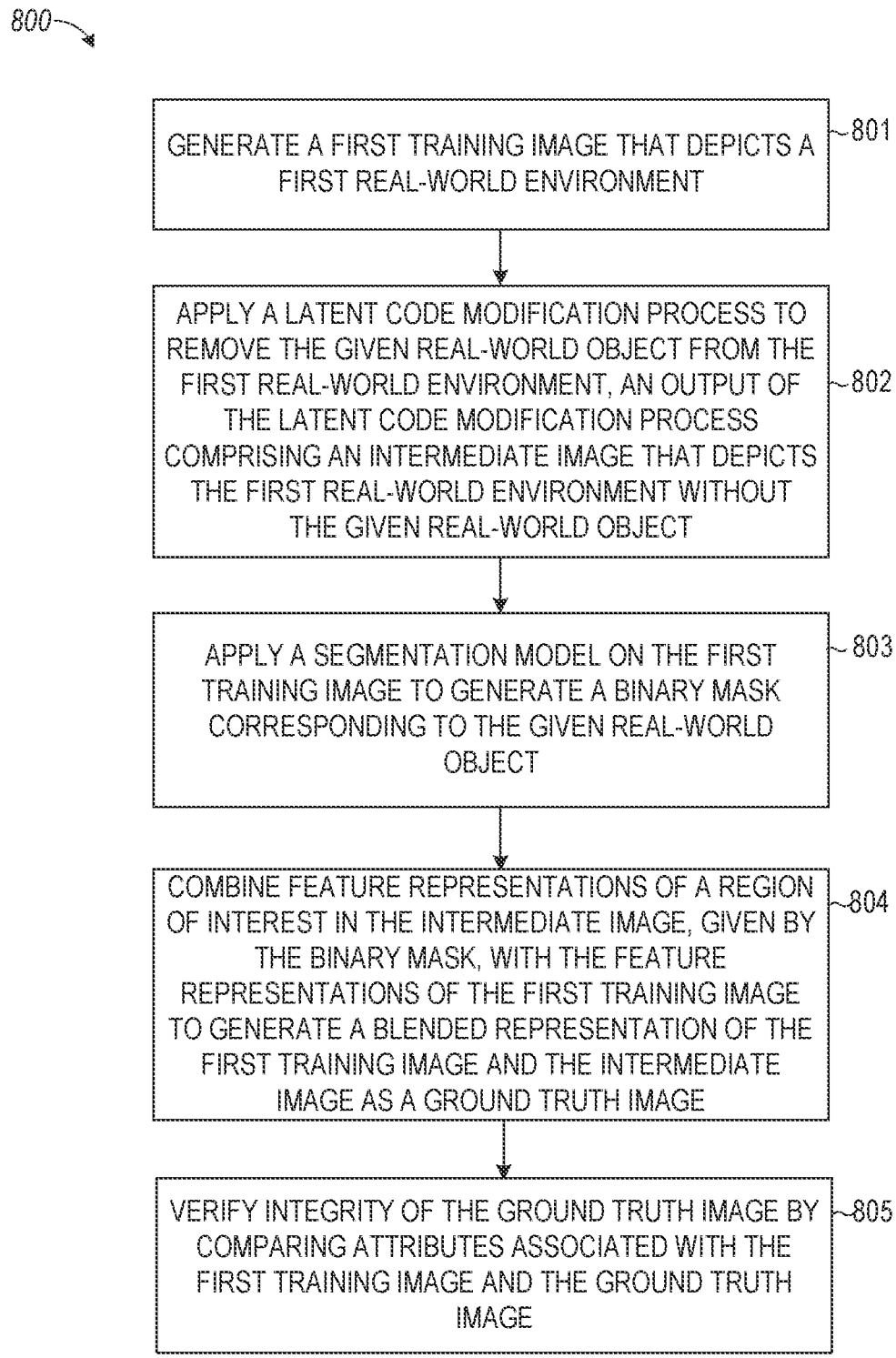
FIGS. 8 and 9 are flowcharts illustrating example operations of the object replacement system, according to examples.

FIG. 8 is a flowchart of a process 800, in accordance with some examples. Although the flowchart can describe the operations as a sequential process, many of the operations can be performed in parallel or concurrently. In addition, the order of certain operations may be rearranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

The process 800 is performed to generate paired training images that include a depiction of a real-world accessory worn by a user and the same user not wearing the real-world accessory (the ground truth image). The process 800 can be repeated any number of times and for any number of different types of real-world accessories. Once complete, the output of the process 800 is used by the object replacement system 224 to train respective machine learning techniques to generate or estimate images that exclude a depiction of a real-world accessory depicted in a received image.

At operation 801, a server obtains, accesses, or generates a first training image that depicts a first real-world environment (e.g., a person's face, a vehicle, a room, and so forth) including a given real-world object (e.g., an accessory on the person's face, hardware on a cabinet, a door on a house, a faucet on a sink, a wheel on a vehicle, eyeglasses, headwear, one or more earrings, one or more piercings, or a necklace), as discussed above. For example, the server can apply a particular type of latent code as a seed to a generative model to generate the first training image.

At operation 802, the server applies a generative neural network including a latent code modification process to remove the given real-world object from the first real-world environment, as discussed above. The generative neural network generates an output that includes an intermediate image that depicts the first real-world environment without the given real-world object. For example, the server can modify the latent code of a seed used in the generative model to generate the intermediate image in which the given real-world object is absent.

At operation 803, the server applies a segmentation model (e.g., a face segmentation model) to the first training image to generate a binary image with a mask (e.g., a binary mask) corresponding to the given real-world object, as discussed above.

At operation 804, the server combines feature representations of a region of interest in the intermediate image, where the region is given by the binary mask (corresponding to a location in which the given real-world object is absent), with the feature representations of the first training image to generate a blended representation of the first training image and the intermediate image as a ground truth image corresponding to the first training image, as discussed above.

At operation 805, the server verifies the integrity of the ground truth image by comparing attributes associated with the first training image and the ground truth image, as discussed above. After the integrity is verified, such as when a verification criterion or one or more verification criteria are met, the ground truth image is paired with the first training image to form a pair of training images.

According to the process of FIG. 8, for example, the server synthetically generates two images as pairs of images for subsequently training another neural network. The first of the two images is generated to include a particular real-world object. Latent code used as a seed for a generative model to generate the first of the two images is modified to generate an intermediate image that does not depict the particular real-world object. Then, a binary mask (generated based on a location in the first of the two images where the particular real-world object is present) is applied to only copy over features from the intermediate image where the particular real-world object is now absent. The first of the two images is modified using the copied features to generate the second of the two images which is ultimately used as a ground-truth image. The original first image and the modified version of the first image are paired and added to a set of training images.

Figure 9:
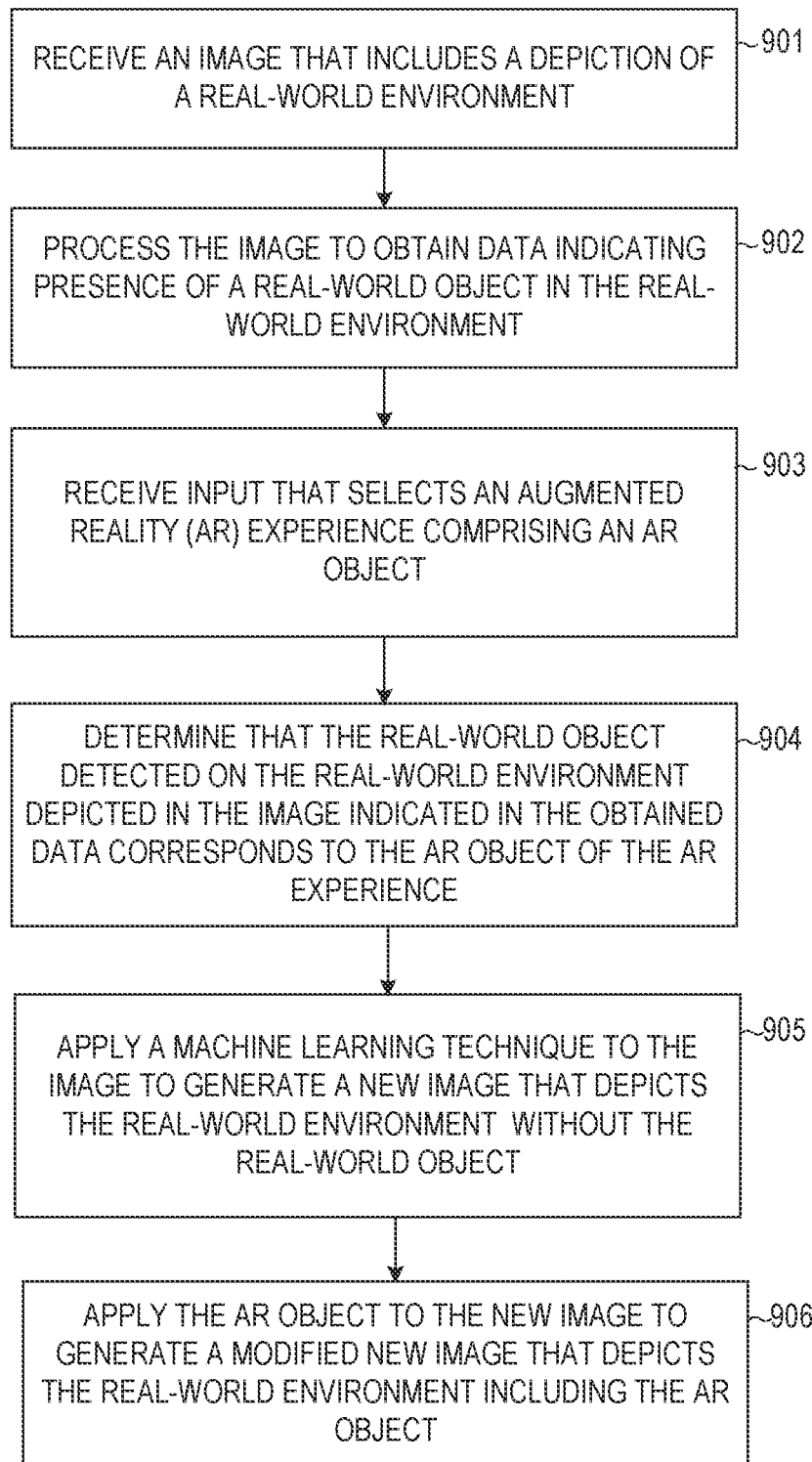

FIG. 9 is a flowchart of a process 900, in accordance with some examples. Although the flowchart can describe the operations as a sequential process, many of the operations can be performed in parallel or concurrently. In addition, the order of the operations may be rearranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 901, a client device 102, receives an image that includes a depiction of a real-world environment (e.g., a face of a person, a vehicle, a room, and so forth), as discussed above.

At operation 902, the client device 102 processes the image to obtain data indicating the presence of a real-world object (e.g., an accessory on the real-world face of the person, hardware on a cabinet, a door on a house, a faucet on a sink, a wheel on a vehicle, eyeglasses, headwear, one or more earrings, one or more piercings, or a necklace), as discussed above.

At operation 903, the client device 102 receives input that selects an AR experience that includes an AR object (e.g., an AR facial accessory, AR hardware on a cabinet, an AR door on a house, an AR faucet on a sink, an AR wheel on a vehicle, AR eyeglasses, AR headwear, one or more AR earrings, one or more AR piercings, or an AR necklace), as discussed above.

At operation 904, the client device 102 determines that the real-world object detected on the real-world environment depicted in the image indicated in the obtained data corresponds to the AR object of the AR experience, as discussed above.

At operation 905, the client device 102 applies a machine learning technique to the image to generate (estimate) a new image that depicts the real environment without the real-world object (e.g., without a depiction of the real-world object), as discussed above.

At operation 906, the client device 102 applies the AR object (e.g., AR facial accessory, AR hardware on a cabinet, an AR door on a house, an AR faucet on a sink, an AR wheel on a vehicle, AR eyeglasses, AR headwear, one or more AR earrings, one or more AR piercings, or an AR necklace) to the new image to generate a modified new image that depicts the real-world environment including the AR object, as discussed above.

Machine Architecture

Figure 10:
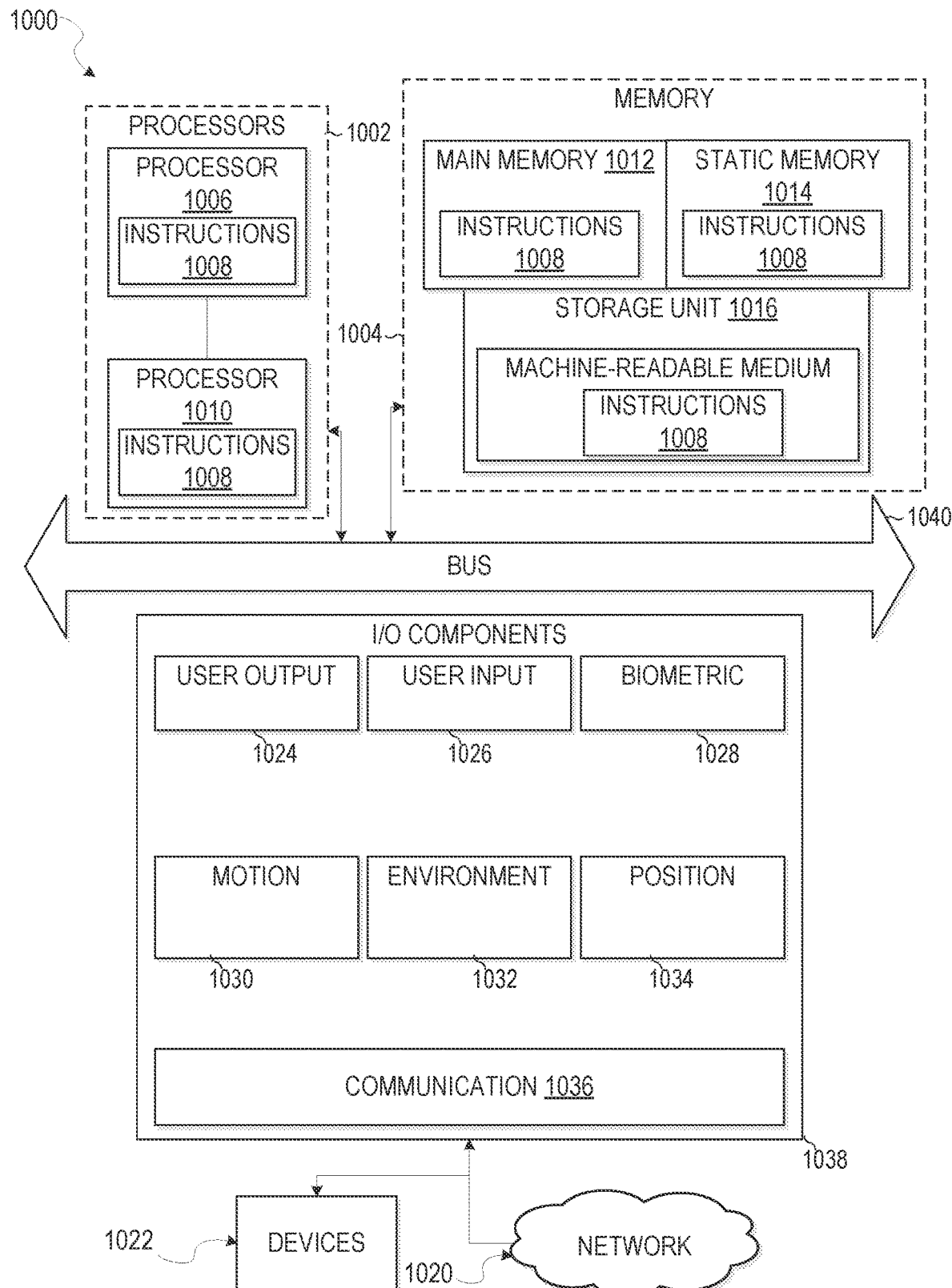
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of a machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein. The machine 1000, for example, may comprise the client device 102 or any one of a number of server devices forming part of the messaging server system 108. In some examples, the machine 1000 may also comprise both client and server systems, with certain operations of a particular method or algorithm being performed on the server-side and with certain operations of the particular method or algorithm being performed on the client-side.

The machine 1000 may include processors 1002, memory 1004, and input/output (I/O) components 1038, which may be configured to communicate with each other via a bus 1040. In an example, the processors 1002 (e.g., a Central Processing Unit (CPU), a Reduced instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single-core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, all accessible to the processors 1002 via the bus 1040. The main memory 1004, the static memory 1014, and the storage unit 1016 store the instructions 1008 embodying any one or more of the methodologies or functions described herein. The instructions 1008 may also reside, completely or partially, within the main memory 1012, within the static memory 1014, within a machine-readable medium within the storage unit 1016, within at least one of the processors 1002 (e.g., within the processor's cache memory), or any suitable combination thereof, during execution thereof by the machine 1000.

The I/O components 1038 may include a wide variety of components to receive input, provide output, produce output, transmit information, exchange information, capture measurements, and so on. The specific I/O components 1038 that are included in a particular machine will depend on the type of machine. For example, portable machines such as mobile phones may include a touch input device or other such input mechanisms, while a headless server machine will likely not include such a touch input device. It will be appreciated that the I/O components 1038 may include many other components that are not shown in FIG. 10. In various examples, the I/O components 1038 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1038 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, rotation sensor components (e.g., gyroscope).

The environmental components 1032 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1038 further include communication components 1036 operable to couple the machine 1000 to a network 1020 or devices 1022 via respective coupling or connections. For example, the communication components 1036 may include a network interface component or another suitable device to interface with the network 1020. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1022 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1012, static memory 1014, and memory of the processors 1002) and storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed examples.

The instructions 1008 may be transmitted or received over the network 1020, using a transmission medium, via a network interface device (e.g., a network interface component included in the communication components 1036) and using any one of several well-known transfer protocols (e.g., hypertext transfer protocol (HTTP)). Similarly, the instructions 1008 may be transmitted or received using a transmission medium via a coupling (e.g., a peer-to-peer coupling) to the devices 1022.

Software Architecture

Figure 11:
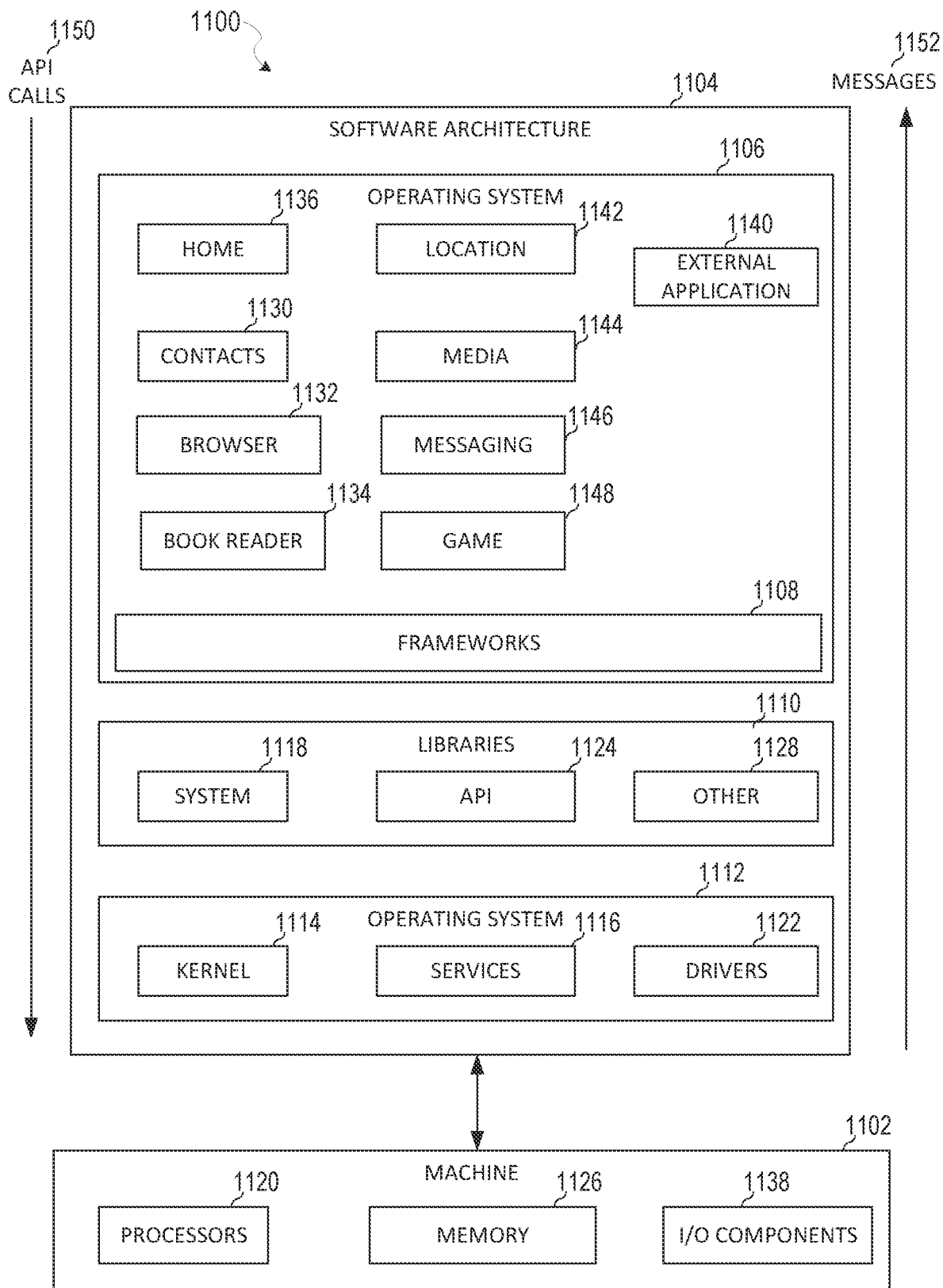
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by the applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as an external application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the external application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the external application 1140 can invoke the API calls 1150 provided by the operating system 1112 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1002 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines, and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
receiving, by one or more processors, an image that includes a depiction of a real-world environment;
processing the image to obtain data indicating presence of a real-world object in the real-world environment;
receiving input that selects an augmented reality (AR) experience comprising an AR object;
determining that the real-world object detected in the real-world environment depicted in the image indicated in the obtained data corresponds to the AR object of the AR experience;
in response to determining that the real-world object detected in the real-world environment depicted in the image indicated in the obtained data corresponds to the AR object of the AR experience, applying a machine learning technique to the image to generate a new image that depicts the real-world environment without the real-world object, the machine learning technique trained by:
receiving training data comprising a plurality of training images that depict real-world environments with a given real-world object and ground truth images that depict the real-world environments without the given real-world object;
applying the machine learning technique to a first training image of the plurality of training images to estimate an image that depicts the real-world environment without the given real-world object;
computing a deviation between the estimated image and a ground truth image associated with the first training image; and
updating parameters of the machine learning technique based on the computed deviation; and
applying the AR object to the new image to generate a modified new image that depicts the real-world environment including the AR object in place of the real-world object.

2. The method of claim 1, further comprising:
accessing a plurality of machine learning techniques, a first of the plurality of machine learning techniques being configured to remove a first type of object from a first image that depicts a first environment including the first type of object, a second of the plurality of machine learning techniques being configured to remove a second type of object from a second image that depicts a second environment including the second type of object.

3. The method of claim 2, further comprising:
determining a type associated with the real-world object detected on the real-world environment depicted in the image indicated in the obtained data; and
selecting the first machine learning technique from the plurality of machine learning techniques as the machine learning technique in response to determining that the type matches the first type of object.

4. The method of claim 1, wherein the real-world object comprises at least one of hardware on a cabinet, a door on a house, a faucet on a sink, a wheel on a vehicle, eyeglasses, headwear, one or more earrings, one or more piercings, or a necklace, and wherein the AR object comprises at least one of AR hardware on a cabinet, an AR door on a house, an AR faucet on a sink, an AR wheel on a vehicle, AR eyeglasses, AR headwear, one or more AR earrings, one or more AR piercings, or an AR necklace.

5. The method of claim 1, wherein applying the AR object to the new image comprises adding a depiction of the AR object to the modified new image.

6. The method of claim 1, wherein the machine learning technique comprises a first neural network.

7. The method of claim 6, further comprising:
training a second neural network from the first neural network using a knowledge distillation process, the second neural network being a compact version of the first neural network and being configured to be implemented on a mobile device.

8. The method of claim 6, wherein the deviation is computed based on perceptual loss.

9. The method of claim 6, further comprising generating the training data by performing operations comprising:
generating the first training image that depicts a first real-world environment;
determining that the first training image includes a depiction of the given real-world object on the first real-world environment;
applying a generative model comprising a latent code modification process to remove the given real-world object from the first real-world environment, an output of the generative model comprising an intermediate image that depicts the first real-world environment without the given real-world object; and
generating the ground truth image corresponding to the first training image based on the intermediate image.

10. The method of claim 9, wherein the ground truth image corresponding to the first training image is generated by performing operations comprising:
applying an environment segmentation model on the first training image to generate a binary mask corresponding to the given real-world object; and
combining feature representations of a region of interest in the intermediate image, where the region of interest is given by the binary mask, with the feature representations of the first training image to generate a blended representation as a ground truth image corresponding to the first training image.

11. The method of claim 10, further comprising verifying integrity of the ground truth image corresponding to the first training image by performing operations comprising:
applying an attribute extractor on the first training image to generate a first set of attributes;
applying the attribute extractor on the ground truth image corresponding to the first training image to generate a second set of attributes; and
determining that one or more verification criteria are satisfied by comparing the first and second sets of attributes.

12. The method of claim 11, wherein the one or more verification criteria comprises:
an indication that the first set of attributes indicates presence of the given real-world object and that the second set of attributes indicates absence of the given real-world object;
a demographic of the first set of attributes matching the demographic in the second set of attributes;
a scene illumination of the first set of attributes matching the scene illumination in the second set of attributes; and
a pose of the first set of attributes matching the pose in the second set of attributes.

13. The method of claim 12, wherein the one or more verification criteria further comprises a facial expression of the first set of attributes matching the facial expression in the second set of attributes.

14. The method of claim 9, further comprising:
computing a first quantity of images in the training data that is associated with a first demographic;
computing a second quantity of images in the training data that is associated with a second demographic; and
selecting a new image associated with the first demographic for adding to the training data in response to determining that the second quantity exceeds the first quantity by more than a threshold value.

15. The method of claim 9, further comprising searching attributes associated with a collection of images to identify the first training image that is associated with an attribute indicating presence of the given real-world object.

16. The method of claim 1, wherein the image is a frame of a real-time video feed received from a client device of a person.

17. The method of claim 1, further comprising:
receiving a video comprising the image depicting the real-world object being moved from a first position to a second position, the second position being closer in proximity to the real-world environment than the first position; and
as the real-world object is being moved, applying the machine learning technique to gradually fade and remove the real-world object from the video.

18. A system comprising:
at least one processor configured to perform operations comprising:
receiving an image that includes a depiction of a real-world environment;
processing the image to obtain data indicating presence of a real-world object in the real-world environment;
receiving input that selects an augmented reality (AR) experience comprising an AR object;
determining that the real-world object detected in the real-world environment depicted in the image indicated in the obtained data corresponds to the AR object of the AR experience;
in response to determining that the real-world object detected in the real-world environment depicted in the image indicated in the obtained data corresponds to the AR object of the AR experience, applying a machine learning technique to the image to generate a new image that depicts the real-world environment without the real-world object, the machine learning technique trained by:
- receiving training data comprising a plurality of training images that depict real-world environments with a given real-world object and ground truth images that depict the real-world environments without the given real-world object;
- applying the machine learning technique to a first training image of the plurality of training images to estimate an image that depicts the real-world environment without the given real-world object;
- computing a deviation between the estimated image and a ground truth image associated with the first training image; and
- updating parameters of the machine learning technique based on the computed deviation; and applying the AR object to the new image to generate a modified new image that depicts the real-world environment including the AR object in place of the real-world object.

19. The system of claim 18, wherein the operations further comprise accessing a plurality of machine learning techniques, a first of the plurality of machine learning techniques being configured to remove a first type of object from a first image that depicts a first environment including the first type of object, a second of the plurality of machine learning techniques being configured to remove a second type of object from a second image that depicts a second environment including the second type of object.

20. A non-transitory machine-readable storage medium that includes instructions that, when executed by one or more processors of a machine, cause the machine to perform operations comprising:
- receiving an image that includes a depiction of a real-world environment;
- processing the image to obtain data indicating presence of a real-world object in the real-world environment;
- receiving input that selects an augmented reality (AR) experience comprising an AR object;
- determining that the real-world object detected in the real-world environment depicted in the image indicated in the obtained data corresponds to the AR object of the AR experience;
- in response to determining that the real-world object detected in the real-world environment depicted in the image indicated in the obtained data corresponds to the AR object of the AR experience, applying a machine learning technique to the image to generate a new image that depicts the real-world environment without the real-world object, the machine learning technique trained by:
  - receiving training data comprising a plurality of training images that depict real-world environments with a given real-world object and ground truth images that depict the real-world environments without the given real-world object;
  - applying the machine learning technique to a first training image of the plurality of training images to estimate an image that depicts the real-world environment without the given real-world object;
  - computing a deviation between the estimated image and a ground truth image associated with the first training image; and
  - updating parameters of the machine learning technique based on the computed deviation; and
- applying the AR object to the new image to generate a modified new image that depicts the real-world environment including the AR object in place of the real-world object.

* * * * *